(12) United States Patent
Izumi et al.

(10) Patent No.: US 9,833,905 B2
(45) Date of Patent: Dec. 5, 2017

(54) ROBOT SYSTEM AND METHOD FOR MANUFACTURING COMPONENT

(71) Applicant: KABUSHIKI KAISHA YASKAWA DENKI, Kitakyushu-shi (JP)

(72) Inventors: Tetsuro Izumi, Kitakyushu (JP); Yukio Hashiguchi, Kitakyushu (JP); Takuya Fukuda, Kitakyushu (JP); Ryoichi Nagai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 472 days.

(21) Appl. No.: 14/571,290

(22) Filed: Dec. 16, 2014

(65) Prior Publication Data

US 2015/0100147 A1    Apr. 9, 2015

Related U.S. Application Data

(63) Continuation of application No. PCT/JP2012/065687, filed on Jun. 20, 2012.

(51) Int. Cl.
*B25J 9/16* (2006.01)
*B25J 9/00* (2006.01)

(52) U.S. Cl.
CPC .......... *B25J 9/1687* (2013.01); *B25J 9/0087* (2013.01); *B25J 9/1682* (2013.01); *G05B 2219/39124* (2013.01); *G05B 2219/39529* (2013.01); *G05B 2219/40028* (2013.01); *Y10S 901/02* (2013.01); *Y10S 901/05* (2013.01); *Y10S 901/09* (2013.01)

(58) Field of Classification Search
None
See application file for complete search history.

(56) References Cited

U.S. PATENT DOCUMENTS

| | | | |
|---|---|---|---|
| 2005/0055132 | A1 | 3/2005 | Matsumoto et al. |
| 2010/0057256 | A1 | 3/2010 | Sato et al. |
| 2011/0040407 | A1 | 2/2011 | Lim et al. |

FOREIGN PATENT DOCUMENTS

| | | |
|---|---|---|
| JP | 62-145305 | 6/1987 |
| JP | 06-079669 | 3/1994 |
| JP | 2003-127081 | 5/2003 |
| JP | 2003-159683 | 6/2003 |
| JP | 2009-061550 | 3/2009 |
| JP | 2009-078308 | 4/2009 |
| JP | 2009-125899 | 6/2009 |
| JP | 2010-058218 | 3/2010 |
| JP | 2011-230245 | 11/2011 |

OTHER PUBLICATIONS

Japanese Office Action for corresponding JP Application No. 2014-521136, dated Jan. 26, 2016.

(Continued)

*Primary Examiner* — Ryan Jarrett
(74) *Attorney, Agent, or Firm* — Mori & Ward, LLP

(57) ABSTRACT

After a forward end of a workpiece is inserted into a through-hole and fitting is started, a follow operation of moving the workpiece to follow the shape of the through-hole is performed during the movement of the workpiece in a fitting direction. At this time, the workpiece is fitted into the through-hole while a control point of a robot is changed in a direction opposite to the fitting direction according to the amount of movement of the workpiece in the fitting direction.

22 Claims, 14 Drawing Sheets

FIRST EMBODIMENT

(56) References Cited

OTHER PUBLICATIONS

Japanese Office Action for corresponding JP Application No. 2014-521136, dated Nov. 10, 2015.
Chinese Office Action for corresponding CN Application No. 201280074121.X, dated Jul. 29, 2015.
English translation of the Written Opinion for corresponding International Application No. PCT/JP2012/065687, dated Sep. 18, 2012.
International Search Report for corresponding International Application No. PCT/JP2012/065687, dated Sep. 18, 2012.
Written Opinion for corresponding International Application No. PCT/JP2012/065687, dated Sep. 18, 2012.
Extended European Search Report for corresponding EP Application No. 12879538.2-1807, dated Jul. 5, 2016.
Elhajj et al., "Tele-coordinated control of multi-robot systems via the Internet", Proceedings of the 2003 IEEE International Conference on Robotics and Automation, Sep. 14-19, 2003, vol. 2, pp. 1646-1652, Sep. 14, 2003, Taipei, Taiwan, XP010667220.
Chien et al., "Configuration space model of tightly coordinated two robot manipulators operating in 3-dimensional workspace", IEEE Transactions on Systems, Man, and Cybernetics, Apr. 1, 1995, pp. 695-704, vol. 25, No. 4, XP000501285.
Chinese Office Action for corresponding CN Application No. 201280074121.X, dated Mar. 4, 2016.

GRASPING STATE

GUIDING STATE

SECTIONAL VIEW IN GUIDING STATE

FOLLOW OPERATION

SECOND EMBODIMENT

FIRST MODIFICATION

SECOND MODIFICATION

ROBOT SYSTEM AND METHOD FOR MANUFACTURING COMPONENT

CROSS-REFERENCE TO RELATED APPLICATION

This application is a continuation of PCT/JP2012/065687, Robot System and Method for Manufacturing Component, Jun. 20, 2012, Tetsuro Izumi, Yukio Hashiguchi, Takuya Fukuda, and Ryoichi Nagai.

BACKGROUND OF THE INVENTION

Field of the Invention

The present invention relates to a robot system and a method for manufacturing a component.

Description of the Related Art

In general, a robot system including a robot arm mounted with a grasping portion (hand) grasping a workpiece (pin) is known. Such a robot system is disclosed in Japanese Patent Laying-Open No. 2003-127081, for example. In the robot system according to the aforementioned Japanese Patent Laying-Open No. 2003-127081, a hand provided on a robot arm grasps a pin, and the pin grasped by the hand is fitted into a hole of a fitted component. In this robot system, the robot arm is so controlled that no force in a direction other than a fitting direction or moment is applied to the pin on the basis of a detection value of a sensor mounted on the robot arm when the pin is fitted, whereby the pin is fitted into the hole of the fitted component.

SUMMARY OF THE INVENTION

A robot system according to a first aspect includes a robot having a robot arm mounted with a grasping portion grasping a workpiece and a control portion transmitting an operation command to the robot. The control portion has a fitting operation control portion controlling the grasping portion of the robot arm to grasp the workpiece and performing a fitting operation while changing a control point set for the robot arm such that the workpiece follows the shape of a workpiece fitted member into which the workpiece is fitted and a control point setting portion changing the control point of the robot in a direction opposite to a fitting direction according to the amount of movement of the workpiece in the fitting direction when the fitting operation control portion performs an operation.

A method for manufacturing a component according to a second aspect is a method for manufacturing a component employing a workpiece and includes grasping the workpiece by a grasping portion of a robot arm, moving a control point set for the robot arm such that the workpiece follows the shape of a workpiece fitted member into which the workpiece is fitted and performing a fitting operation, and changing the control point of the robot in a direction opposite to a fitting direction according to the amount of movement of the workpiece in the fitting direction when the fitting operation is performed.

According to the aforementioned structure, the workpiece can be smoothly fitted into the workpiece fitted member even in the case where the workpiece is moved in the fitting direction.

DESCRIPTION OF THE EMBODIMENTS

Embodiments are hereinafter described on the basis of the drawings.

First Embodiment

The structure of a robot system 100 according to a first embodiment is now described with reference to FIGS. 1 to 11.

Figure 1:
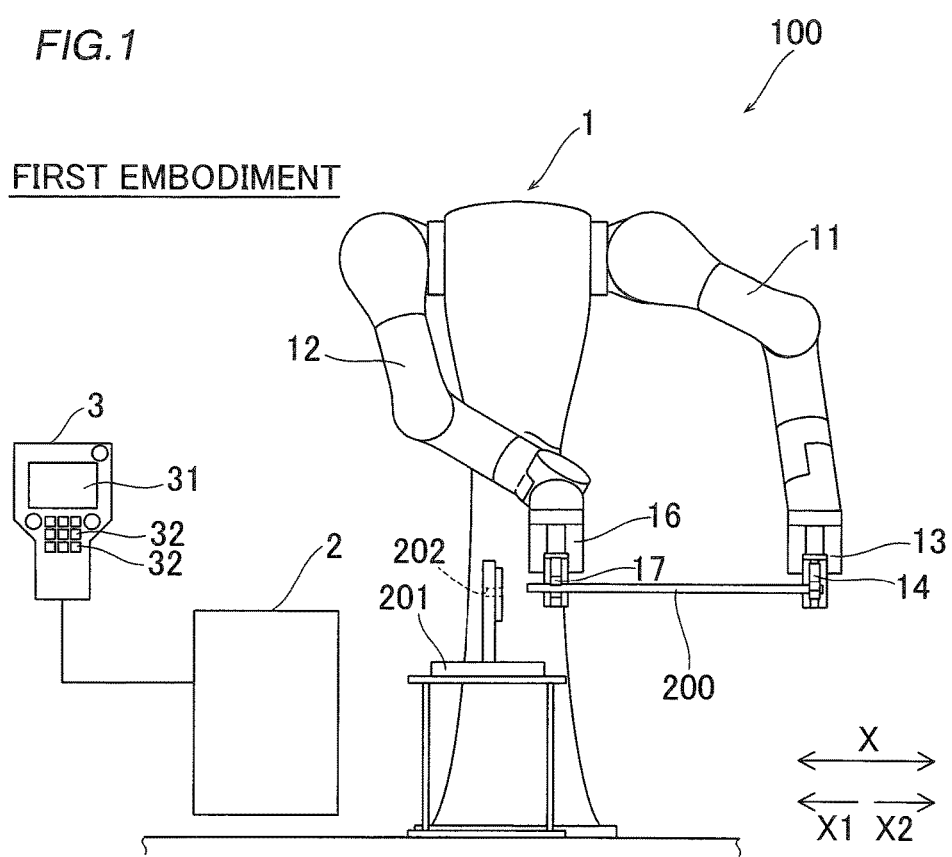
FIG. 1 is an overall view of a robot system according to a first embodiment.

As shown in FIG. 1, the robot system 100 includes a robot 1, a robot controller 2, and a teaching apparatus 3. In the vicinity of the robot 1, a thin plate-like (plate-like) workpiece fitted member 201 into which a workpiece 200 is fitted is arranged.

Figure 2:
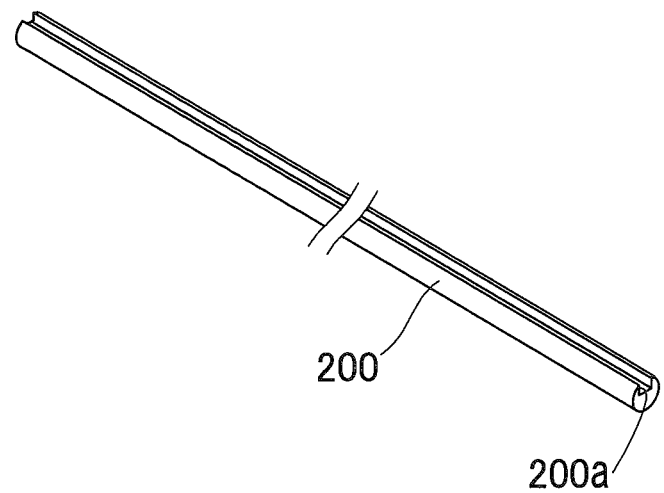
FIG. 2 is a perspective view of a workpiece according to the first embodiment.
Figure 3:
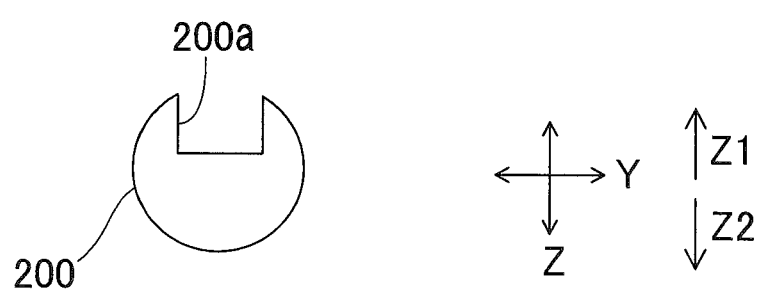
FIG. 3 is a front elevational view of the workpiece according to the first embodiment as viewed in a fitting direction.
Figure 4:
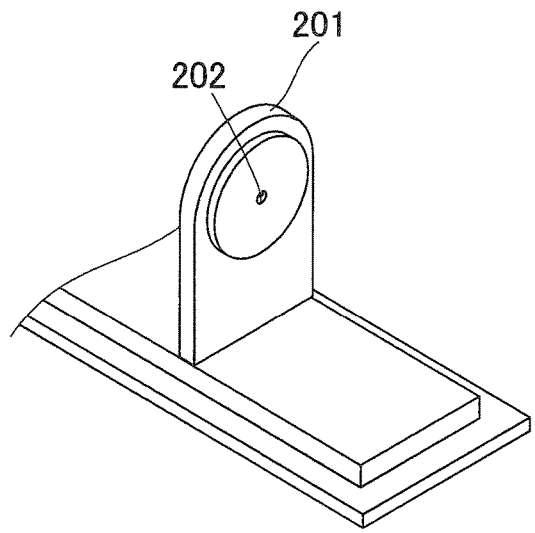
FIG. 4 is a perspective view of a workpiece fitted member according to the first embodiment.
Figure 5:
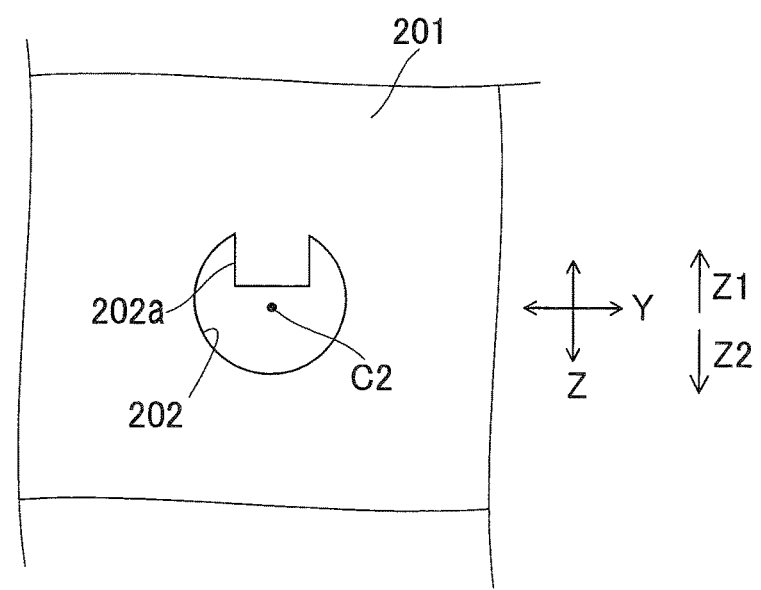
FIG. 5 is a front elevational view of a through-hole according to the first embodiment as viewed in the fitting direction.

As shown in FIG. 2, the workpiece 200 is long bar-shaped. According to the first embodiment, the workpiece 200 has an incomplete circular cross-section, as shown in FIG. 3. Specifically, the workpiece 200 is formed with a groove portion 200a having a rectangular cross-section along the extensional direction of the workpiece 200. As shown in FIGS. 4 and 5, the workpiece fitted member 201 is provided with an incomplete circular through-hole (hole) 202 substantially coinciding with the cross-sectional shape of the workpiece 200 in order to fit with the workpiece 200. Specifically, the through-hole 202 has a projecting portion 202a protruding downwardly (along arrow Z2) to correspond to the groove portion 200a of the workpiece 200. The workpiece 200 is moved in a transverse direction (direction X) and is fitted into the through-hole 202.

As shown in FIG. 1, the robot 1 has two robot arms 11 and 12 provided on both upper ends of a base 10 set on a set surface, respectively. The robot arms 11 and 12 are so-called articulated robots and have a plurality of joints and a plurality of actuators (not shown) driving the respective joints. The actuators have servomotors and speed reducers. Each of the servomotors is connected to the robot controller 2 and is so configured that the operation thereof is controlled on the basis of an operation command from the robot controller 2. The robot arms 11 and 12 are examples of the "first robot arm" and the "second robot arm", respectively.

Figure 6:
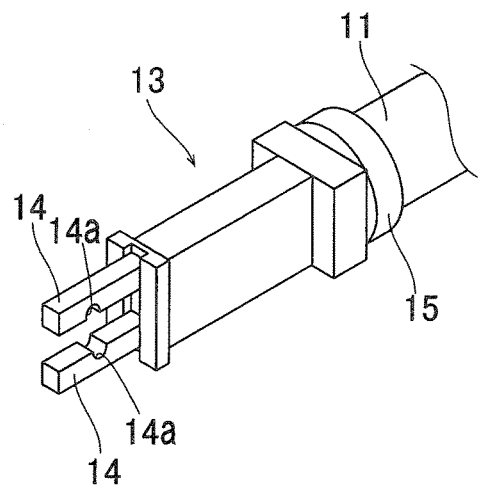
FIG. 6 is a perspective view of a grasping portion of the robot system according to the first embodiment.
Figure 7:
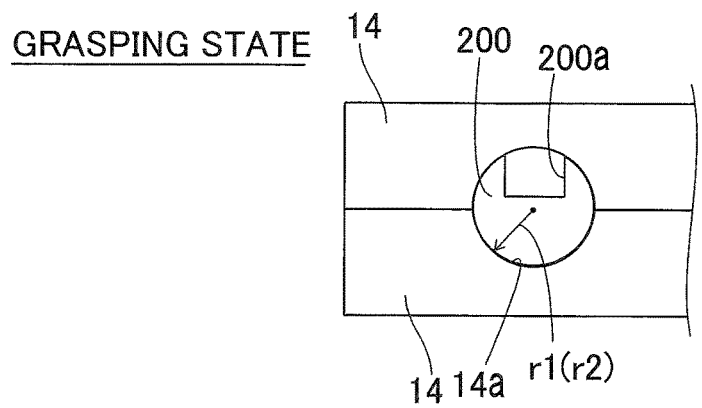
FIG. 7 is a diagram illustrating a state where the grasping portion of the robot system according to the first embodiment grasps the workpiece, as viewed in the fitting direction.

A grasping portion 13 configured to grasp the base side (along arrow X2) of the workpiece 200 distanced from the through-hole 202 into which the workpiece 200 is fitted is mounted on a forward end of the robot arm 11. As shown in FIG. 6, the grasping portion 13 is provided with a pair of claw portions 14 openable and closable by the unshown actuator. The claw portions 14 are provided with groove portions 14a having semicircular cross-sections. As shown in FIG. 7, the groove portions 14a are so configured that the radius r1 of each of the groove portions 14a is substantially equal to the radius r2 of the workpiece 200. The claw portions 14 are configured to come into contact with the workpiece 200 in a closed state to grasp the workpiece 200. According to the first embodiment, the grasping portion 13 is configured as a gripper grasping the workpiece 200, but the grasping portion may be configured in a different manner capable of holding the workpiece 200, in which the workpiece 200 is suctioned and held, for example.

According to the first embodiment, a force sensor 15 is mounted between the robot arm 11 and the grasping portion 13, as shown in FIG. 6. The force sensor 15 includes a six-axis force sensor capable of detecting acceleration along an X-axis, a Y-axis, and a Z-axis and angular velocities along the X-axis, the Y-axis, and the Z-axis.

Figure 8:
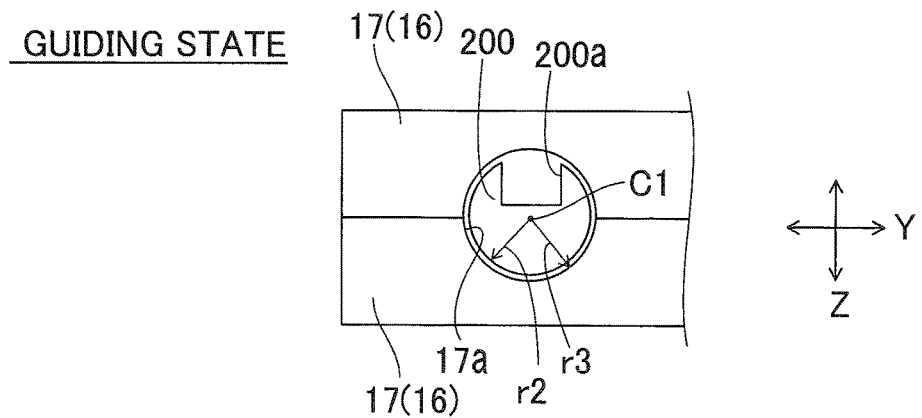
FIG. 8 is a diagram illustrating a state where a guide grasping portion of the robot system according to the first embodiment guides the workpiece, as viewed in the fitting direction.

As shown in FIG. 1, a guide grasping portion 16 configured to guide the workpiece 200 while movably grasping the forward end side (along arrow X1) of the workpiece 200 in the vicinity of the through-hole 202 is mounted on a forward end of the robot arm 12. As shown in FIG. 8, the guide grasping portion 16 is provided with a pair of claw portions 17 openable and closable by the unshown actuator. The claw portions 17 are provided with groove portions 17a having semicircular cross-sections. The groove portions 17a are so configured that the radius r3 of each of the groove portions 17a is larger than the radius r2 of the workpiece 200. Thus, a clearance exists between the groove portions 17a and the workpiece 200 in a state where the claw portions 17 are closed, whereby the guide grasping portion 16 guides the workpiece 200 along the shapes of the groove portions 17a while supporting the forward end side of the workpiece 200 movably in the long axis direction of the workpiece. The guide grasping portion 16 of the robot arm 12 is configured to guide the long bar-shaped workpiece 200 while movably surrounding the periphery (outer periphery) of the workpiece 200 on the forward end side. In the case where the workpiece 200 is bent downwardly (along arrow Z2), for example, the workpiece 200 is guided in a state where a lower portion (lower surface) of the workpiece 200 comes into contact with one of the groove portions 17a. The guide grasping portion 16 is an example of the "grasping portion".

Figure 9:
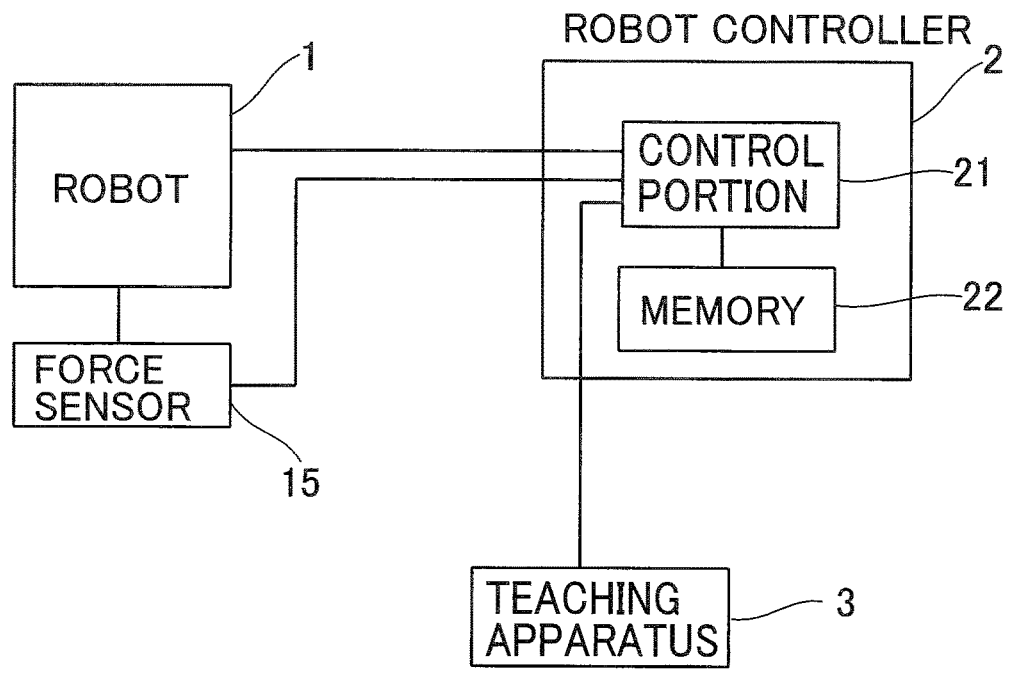
FIG. 9 is a block diagram of the robot system according to the first embodiment.
Figure 10:
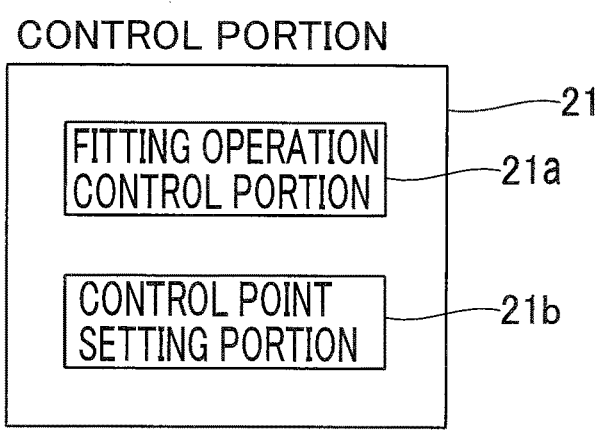
FIG. 10 is a block diagram of the robot system according to the first embodiment.

As shown in FIG. 9, the robot controller 2 has a control portion 21 performing calculation and transmitting and receiving a signal and a memory 22 storing input information, and the memory 22 is connected to the control portion 21. The robot 1, the teaching apparatus 3, and the force sensor 15 are connected to the control portion 21 of the robot controller 2. The control portion 21 is connected to the robot 1, transmits the operation command to each of the servomotors of the robot 1, and acquires a signal from each of the servomotors.

The control portion 21 has a fitting operation control portion 21a and a control point setting portion 21b as functional configurations. The fitting operation control portion 21a controls the grasping portion 13 of the robot arm 11 to grasp the workpiece 200 and insert the workpiece 200 into the through-hole 202 of the workpiece fitted member 201 on the basis of an operation locus (also referred to as teaching data) previously stored in the memory 22. At this time, the robot arm 11 is controlled to operate so that the workpiece 200 follows the shape of the through-hole 202. The teaching data is information about the position and posture of the robot 1 and has information about the position of the control point P where translation is performed and the position of the control point P where rotation is performed (teaching point). The fitting operation control portion 21a performs inverse kinematics calculation such that the position of the control point P becomes the teaching data or a control target position generated on the basis of the teaching data and calculates the command position of each of the servomotors of the robot 1. Then, the fitting operation control portion 21a transmits the operation command to each of the servomotors.

The control point setting portion 21b has a function of setting where the control point P is during the operation of the robot 1. The position of the control point P is successively transmitted to the fitting operation control portion 21a. More specifically, the control point setting portion 21b sets the control point P in a forward end of the workpiece 200 held by the robot 1 not during a fitting operation period.

The control point P is set in the forward end of the workpiece 200, whereby an operator can conveniently teach the operation of the robot 1 sensuously when teaching the operation of the robot 1. The control point setting portion 21b is configured to perform control of fitting the workpiece 200 while changing the control point P of the robot 1 in a direction opposite to a fitting direction according to the amount of movement of the workpiece 200 in the fitting direction from the start of fitting of the workpiece 200 into the workpiece fitted member 201 (the start of the fitting operation period).

As shown in FIG. 1, the teaching apparatus 3 is connected to the robot controller 2 (control portion 21). The teaching apparatus 3 has a function of teaching the movement of the robot 1. The teaching apparatus 3 is provided with a display portion 31. The teaching apparatus 3 is also provided with a plurality of keys 32.

Figure 11:
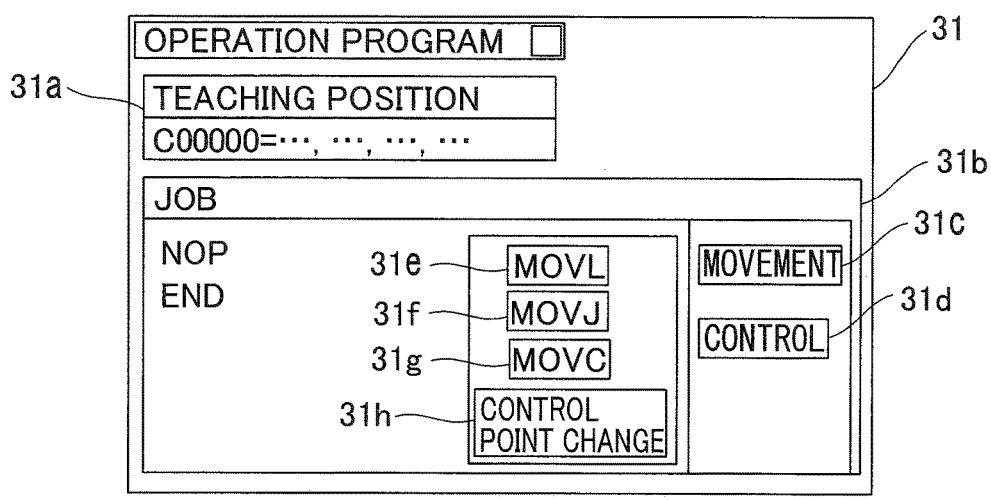
FIG. 11 is a diagram showing a display portion of a teaching apparatus of the robot system according to the first embodiment.

As shown in FIG. 11, the display portion 31 of the teaching apparatus 3 is configured to display a teaching position screen 31a representing the teaching position of the robot 1 and a JOB screen 31b on which a program operating the robot 1 is displayed. On the JOB screen 31b, buttons classifying JOB commands, such as a movement button 31c and a control button 31d are displayed. On the JOB screen 31b, a linear interpolation button (MOVL) 31e, a link interpolation button (MOVJ) 31f, a circular interpolation button (MOVC) 31g, etc. configured to register movement commands for commanding the movement of the robot 1 are displayed. The linear interpolation is a command for linearly moving the forward ends of the robot arms 11 and 12. The link interpolation is a command for driving the joints of the robot arms 11 and 12 individually and moving the robot arms 11 and 12 to prescribed positions in the shortest amount of time. The circular interpolation is a command for circularly moving the forward ends of the robot arms 11 and 12. According to the first embodiment, a control point change button 31h configured to accept an input of a command for operating the robot 1 in an operation mode in which the control point P of the robot 1 is changed according to the amount of movement of the workpiece 200 in the fitting direction when the operation is taught is displayed on the display portion 31. The control point change button 31h is an example of the "input portion".

Operations of the control portion 21 of the robot controller 2 for fitting the workpiece 200 into the through-hole 202 are now described with reference to FIGS. 12 to 17. At the start of the operations, the control point P of the robot 1 is set in the vicinity of the forward end of the workpiece 200 closer to the through-hole 202.

Figure 12:
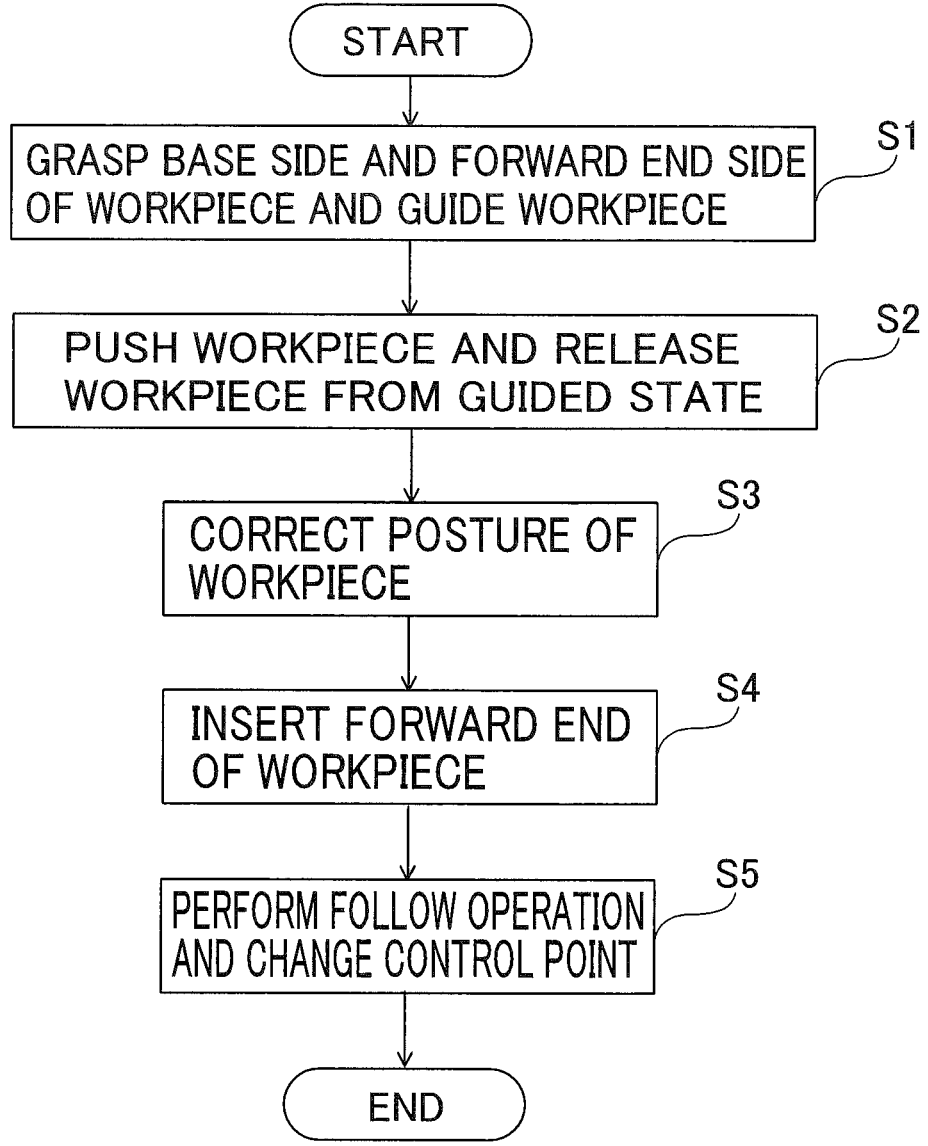
FIG. 12 is a flow diagram for illustrating operations of a control portion of the robot system according to the first embodiment.
Figure 13:
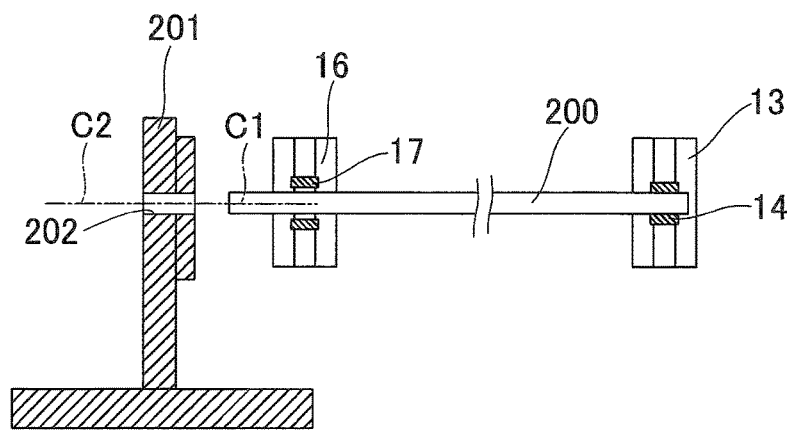
FIG. 13 is a sectional view showing a state where the guide grasping portion guides the workpieces while the grasping portion grasps the workpiece in the robot system according to the first embodiment.

First, at a step S1 shown in FIG. 12, the control potion 21 controls the grasping portion 13 (claw portions 14) of the robot arm 11 to grasp the base side of the workpiece 200 distanced from the through-hole 202, as shown in FIG. 13. Furthermore, the control portion 21 controls the guide grasping portion 16 of the robot arm 12 to guide the workpiece 200 while movably grasping the forward end side of the workpiece 200 in the vicinity of the through-hole 202. Specifically, the control portion 21 controls the guide grasping portion 16 of the robot arm 12 to guide the workpiece 200 while movably grasping the forward end side of the workpiece 200 such that a centerline C1 passing through the guide center (center in directions Y and Z, see FIG. 8) of the guide grasping portion 16 (groove portions 17a of the claw portions 17) of the robot arm 12 as viewed in the fitting direction and a centerline C2 passing through the center (center in the directions Y and Z, see FIG. 5) of the through-hole 202 as viewed in the fitting direction substantially coincide with each other.

Figure 14:
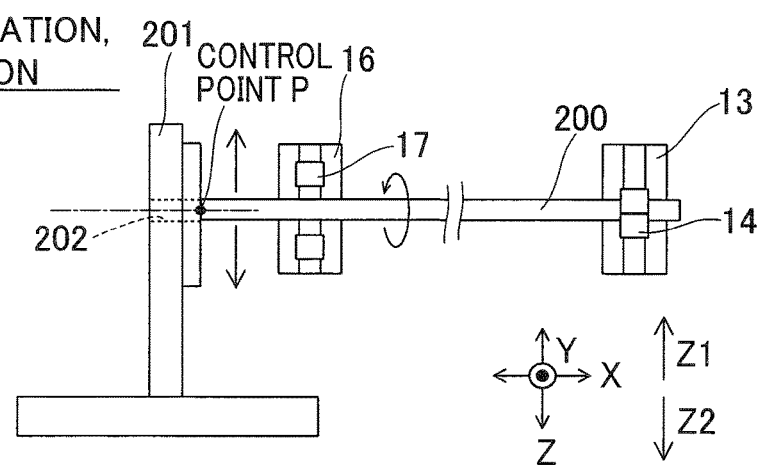
FIG. 14 is a diagram showing a state where the grasping portion of the robot system according to the first embodiment translates and rotates the workpiece.

Then, at a step S2, the control portion 21 operates the robot arm 11 in a state where the guide grasping portion 16 of the robot arm 12 guides the workpiece 200 while movably grasping the forward end side of the workpiece 200 to push the workpiece 200 toward the through-hole 202 (workpiece fitted member 201), as shown in FIG. 14. Thereafter, the control portion 21 releases the workpiece 200 from a state guided by the robot arm 12 before fitting the workpiece 200 into the through-hole 202. Then, at a step S3, the control portion 21 performs control of correcting the posture of the workpiece 200 to be fittable into the through-hole 202 (specifically, to direct an opening of the groove 200a (see FIG. 3) of the workpiece 200 along arrow Z1) by rotating the workpiece 200, employing a direction along the pushing direction (direction X) of the workpiece 200 as a rotation axis. If the posture (form) of the workpiece 200 is not fittable (fittable by rotating the workpiece 200) even in a state where the workpiece 200 is guided, the workpiece 200 is translated with respect to the through-hole 202 (workpiece fitted member 201) (on a plane Y-Z) in order to search the through-hole 202.

Then, at a step S4, the control portion 21 controls the robot arm 11 to move the workpiece 200 in the transverse direction (along arrow X1) and fit the forward end of the workpiece 200 into the through-hole 202.

Figure 15:
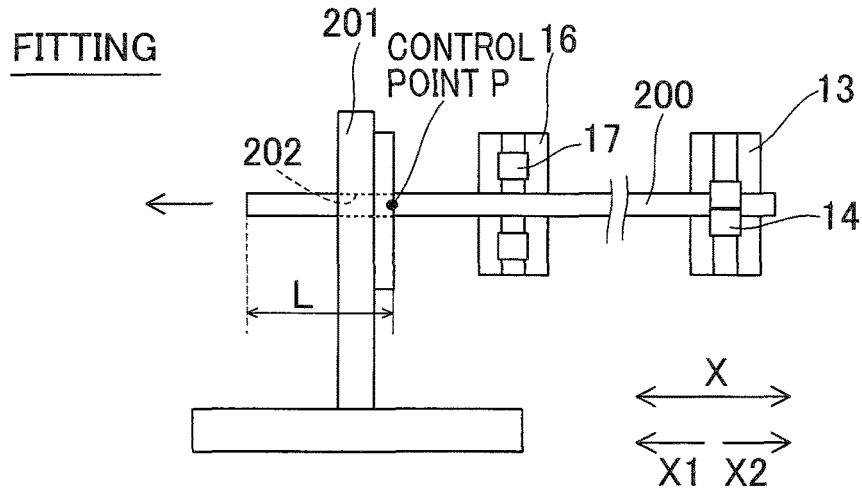
FIG. 15 is a diagram showing a state where the grasping portion of the robot system according to the first embodiment fits (inserts) the workpiece into the workpiece fitted member.
Figure 16:
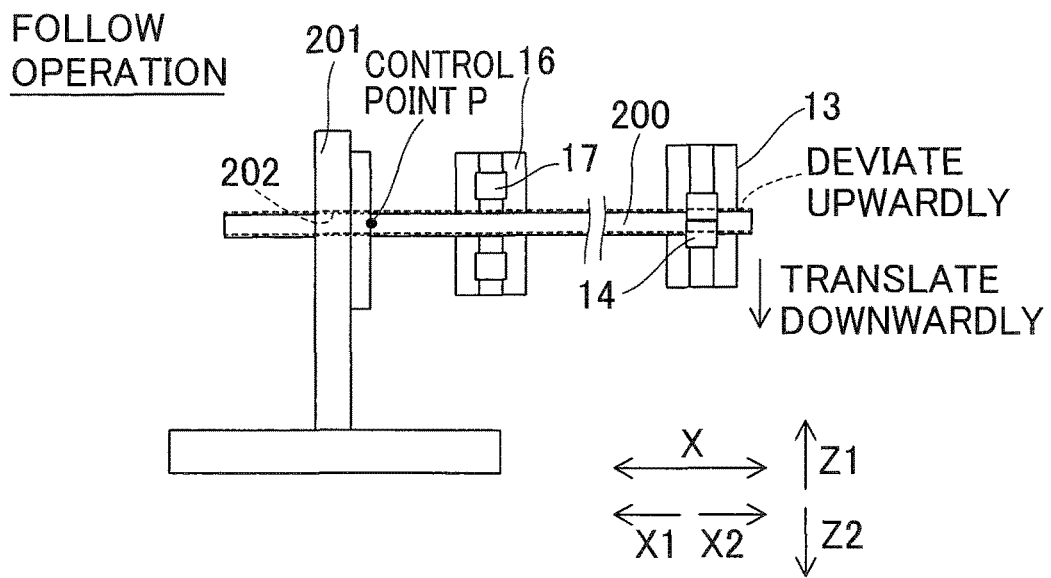
FIG. 16 is a diagram for illustrating a follow operation performed by translating the workpiece in the robot system according to the first embodiment.
Figure 17:
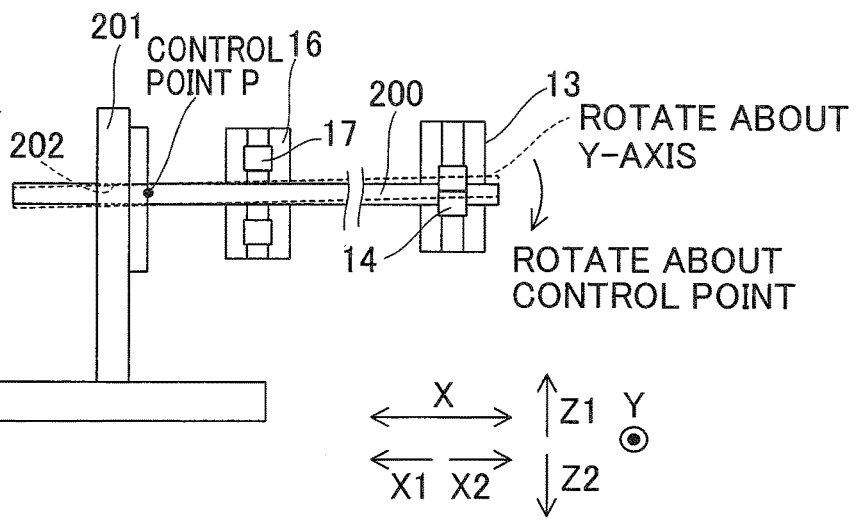
FIG. 17 is a diagram for illustrating a follow operation performed by rotating the workpiece about a control point in the robot system according to the first embodiment.

According to the first embodiment, at a step S5, after the forward end of the workpiece 200 is inserted into the through-hole 202 and fitting is started, as shown in FIG. 15, the control portion 21 performs a follow operation of moving the workpiece 200 to follow the shape of the through-hole 202, described later, during the movement of the workpiece 200 in the fitting direction. At this time, the workpiece 200 is fitted into the through-hole 202 while the control point P of the robot 1 is changed in the direction opposite to (along arrow X2) the fitting direction according to the amount of movement of the workpiece 200 in the fitting direction (along arrow X1). Specifically, the control point P of the robot 1 set in the vicinity of the forward end of the workpiece 200 before the fitting operation is changed from the vicinity of the forward end of the workpiece 200 to the base side (along arrow X2) thereof by the amount of movement of the workpiece 200 in the fitting direction before the fitting operation. In the case where the workpiece 200 is moved by a distance L in the fitting direction (along arrow X1), for example, the control point P of the robot 1 is changed from the vicinity of the forward end of the workpiece 200 to the base side by the distance L. The control point P of the robot 1 is continuously (i.e. each time the workpiece 200 is moved) changed according to the amount of movement of the workpiece 200 in the fitting direction.

According to the first embodiment, the control point P of the robot 1 is sequentially changed to be located in the vicinity of a close point where the workpiece 200 and the through-hole 202 are close to each other (usually, they are in contact with each other) while the workpiece 200 is moved in the fitting direction. Specifically, the control point P of the robot 1 is sequentially changed to be located at the position of the workpiece 200 corresponding to the vicinity of an end of the through-hole 202 including a hole, on a side from which the workpiece 200 is inserted (the end of the through-hole 202 along arrow X2, see the control point P in FIG. 15) while the workpiece 200 is moved in the fitting direction.

According to the first embodiment, the control portion 21 performs the follow operation of moving the workpiece 200 to follow the shape of the through-hole 202 such that force and moment applied to the control point P are reduced to substantially zero on the basis of force information obtained from the force sensor 15. Specifically, in the case where the workpiece 200 is deviated upwardly (along arrow Z1), as shown by a dotted line in FIG. 16, the control portion 21 performs the follow operation such that the force and moment applied to the control point P are reduced to substantially zero by moving the grasping portion 13 of the robot arm 11 downwardly (along arrow Z2) and translating the workpiece 200 downwardly. In the case where the workpiece 200 is rotated about the control point P (rotated about the Y-axis), as shown by a dotted line in FIG. 17, the control portion 21 performs the follow operation such that the force and moment applied to the control point P are reduced to substantially zero by rotating the grasping portion 13 of the robot arm 11 about the control point P (rotating the grasping portion 13 of the robot arm 11 about the Y-axis) and rotating the workpiece 200 about the control point P (rotating the workpiece 200 about the Y-axis).

Then, the control portion 21 inserts the workpiece 200 into the through-hole 202 to a position previously taught while performing the follow operation and changing the control point P, and terminates the operations for fitting the workpiece 200 into the through-hole 202.

According to the first embodiment, as hereinabove described, the control portion 21 is configured to perform control of fitting the workpiece 200 into the through-hole 202 while changing the control point P of the robot 1 in the direction opposite to the fitting direction according to the amount of movement of the workpiece 200 in the fitting direction when the control portion 21 controls the grasping portion 13 of the robot arm 11 to grasp the workpiece 200 and performs the follow operation of moving the workpiece 200 to follow the shape of the through-hole 202 into which the workpiece 200 is fitted. In the robot system 100 according to the first embodiment, the control point P used by the fitting operation control portion 21a to control the robot arm 11 is constantly set at a position where the workpiece 200 is fitted into the workpiece fitted member 201 when the fitting operation is performed. Thus, follow operation control is constantly performed directly on a position where the force and moment are actually desired to be set to zero (fitting position), and hence a more accurate follow operation can be performed, as compared with the case where the position of the control point P is not changed from the position of the forward end of the workpiece 200, for example. Thus, the workpiece 200 can be smoothly fitted into the through-hole 202. In other words, when the fitting operation is performed in a state where the control point P is not changed from the position of the forward end of the workpiece 200, for example, the fitting position actually applied with the force and moment and the position of the control point P are deviated from each other, and hence a position (fitting position) where the body force and moment are desired to be minimized can be only indirectly controlled. Consequently, a state where fitting cannot be smoothly performed due to excessive contact, interference, or the like of the workpiece 200 with the workpiece fitted member 201 can be avoided.

According to the first embodiment, as hereinabove described, the control portion 21 is configured to set the control point P of the robot 1 in the vicinity of the forward end of the workpiece 200 closer to the through-hole 202 before the fitting operation and change the control point P of the robot 1 from the vicinity of the forward end of the workpiece 200 to the base side thereof by the amount of movement of the workpiece 200 in the fitting direction during the fitting operation. Thus, the control point P can be easily changed to the position of the workpiece 200 applied with the force and moment.

According to the first embodiment, as hereinabove described, the control portion 21 is configured to perform control of sequentially changing the control point P of the robot 1 such that the control point P of the robot 1 is located at the position of the workpiece 200 corresponding to the vicinity of the close point where the workpiece 200 and the through-hole 202 are in contact with each other while moving the workpiece 200 in the fitting direction. Thus, the control point P of the robot 1 is located at the position of the workpiece 200 corresponding to the vicinity of the close point where the workpiece 200 and the through-hole 202 are in contact with each other, easily applied with the force and moment, and hence the force and moment applied to the workpiece 200 can be easily reduced to substantially zero.

According to the first embodiment, as hereinabove described, the control portion 21 is configured to perform control of sequentially changing the control point P of the robot 1 such that the control point P of the robot 1 is located at the position of the workpiece 200 corresponding to the vicinity of the end of the through-hole 202 including the hole, on the side from which the workpiece 200 is inserted while moving the workpiece 200 in the fitting direction. Thus, the control point P of the robot 1 is located at the position of the workpiece 200 corresponding to the vicinity of the end of the through-hole 202 on the side from which the workpiece 200 is inserted, easily applied with the force and moment, and hence the force and moment applied to the workpiece 200 can be easily reduced to substantially zero.

According to the first embodiment, as hereinabove described, the control portion 21 is configured to perform control of fitting the workpiece 200 into the through-hole 202 while changing the control point P of the robot 1 in the direction opposite to the fitting direction according to the amount of movement of the workpiece 200 in the fitting direction when performing the follow operation of moving the workpiece 200 to follow the shape of the through-hole 202 during the insertion of the workpiece 200 into the through-hole 202 after inserting the forward end of the workpiece 200 into the through-hole 202. Thus, after the forward end of the workpiece 200 is inserted into the through-hole 202, the workpiece 200 can be smoothly fitted into the through-hole 202 during the fitting operation while the workpiece 200 is inserted into the through-hole 202.

According to the first embodiment, as hereinabove described, the control portion 21 is configured to perform control of continuously changing the control point P of the robot 1 according to the amount of movement of the workpiece 200 in the fitting direction. Thus, the control point P can be constantly located at the position of the workpiece 200 applied with the force and moment, and hence the workpiece 200 can be more smoothly fitted into the through-hole 202.

According to the first embodiment, as hereinabove described, the control portion 21 is configured to perform control of fitting the workpiece 200 into the through-hole 202 while changing the control point P of the robot 1 in the direction opposite to the fitting direction according to the amount of movement of the workpiece 200 in the fitting direction when performing the follow operation of moving the workpiece 200 to follow the shape of the through-hole 202 such that the force and moment applied to the control point P are reduced to substantially zero. Thus, the workpiece 200 is moved such that the force and moment are reduced to substantially zero in a state where the control point P is located at the position of the workpiece 200 applied with the force and moment, and hence the workpiece 200 can be further smoothly fitted into the through-hole 202.

According to the first embodiment, as hereinabove described, the control portion 21 is configured to perform control of fitting the workpiece 200 into the through-hole 202 while changing the control point P of the robot 1 in the direction opposite to the fitting direction according to the amount of movement of the workpiece 200 in the fitting direction when performing the follow operation of moving the workpiece 200 to follow the shape of the through-hole 202 on the basis of the force information obtained from the force sensor 15. Thus, the follow operation can be accurately performed on the basis of the force information obtained from the force sensor 15, and hence the follow operation can be effectively performed.

According to the first embodiment, as hereinabove described, the control portion 21 is configured to perform control of fitting the workpiece 200 into the through-hole 202 while changing the control point P of the robot 1 in the direction opposite to the fitting direction according to the amount of movement of the workpiece 200 in the fitting direction when performing the follow operation of moving the workpiece 200 to follow the shape of the through-hole 202 by translating the workpiece 200 and rotating the workpiece 200 about the control point P on the basis of the force information obtained from the force sensor 15. Thus, the force and moment applied to the control point P can be easily reduced to substantially zero even in the case where the force and moment are applied to the workpiece 200.

According to the first embodiment, as hereinabove described, the teaching apparatus 3 includes the control point change button 31h configured to accept the input of the command for operating the robot 1 in the operation mode in which the control point P of the robot 1 is changed according to the amount of movement of the workpiece 200 in the fitting direction when teaching the operation of the robot 1. Thus, the operation of the robot 1 in the operation mode in which the control point of the robot 1 is changed can be easily taught with the teaching apparatus 3.

According to the first embodiment, as hereinabove described, the guide grasping portion 16 of the robot arm 12 guides the forward end side of the workpiece 200, and the robot arm 11 pushes the workpiece 200 toward the through-hole 202 and inserts the forward end of the workpiece 200 into the through-hole 202. Thus, the forward end side of the workpiece 200 is guided by the guide grasping portion 16 of the robot arm 12, and hence the forward end of the workpiece 200 can be inserted into the through-hole 202 even in the case where the posture of the workpiece 200 is inappropriate for fitting.

Second Embodiment

The structure of a robot system 101 according to a second embodiment is now described with reference to FIG. 18. In this second embodiment, a workpiece 200 is fitted into two through-holes 211 and 212, unlike the aforementioned first embodiment in which the workpiece 200 is fitted into the single through-hole 202. The through-holes 211 and 212 are examples of the "first through-hole" and the "second through-hole", respectively.

Figure 18:
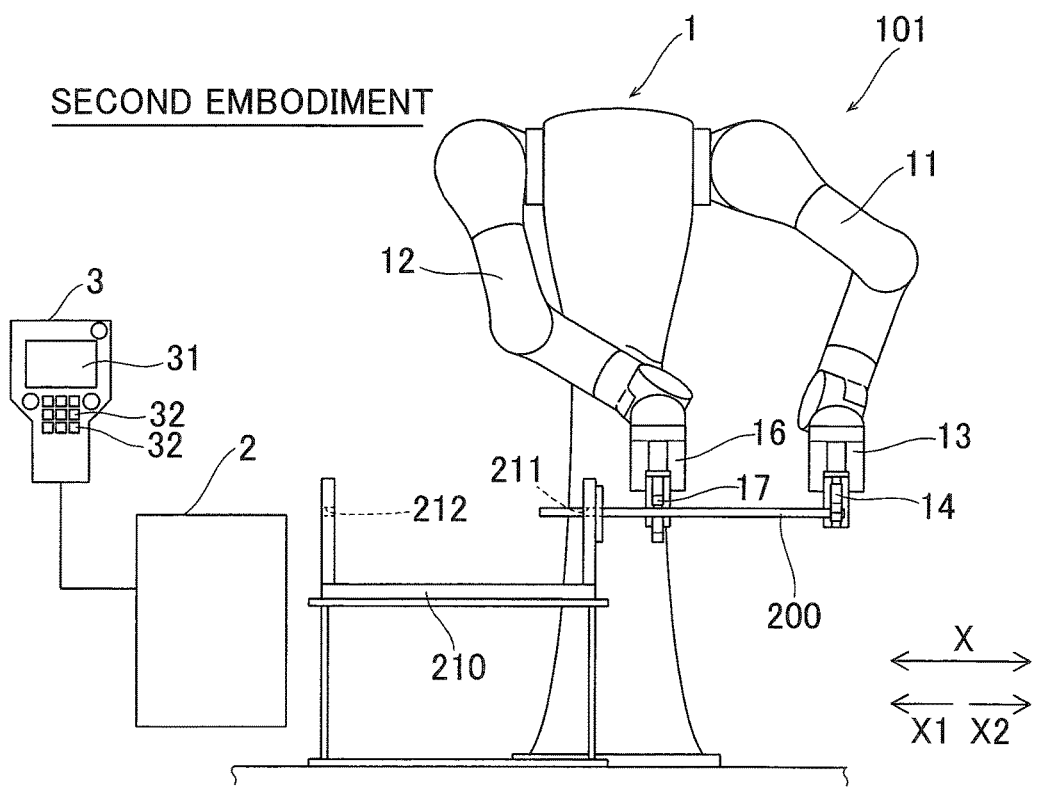
FIG. 18 is an overall view of a robot system according to a second embodiment.

As shown in FIG. 18, a workpiece fitted member 210 into which the workpiece 200 is fitted is arranged in the vicinity of a robot 1. The workpiece fitted member 210 includes the through-hole 211 and the through-hole 212 including through-holes arranged adjacent to each other in the fitting direction (direction X) of the workpiece 200. The through-hole 211 and the through-hole 212 each include an incomplete circular hole substantially coinciding with the cross-sectional shape of the workpiece 200, similarly to the through-hole 202 (see FIG. 5) according to the aforementioned first embodiment. The remaining structure of the second embodiment is similar to that of the aforementioned first embodiment.

Operations of a control portion 21 of a robot controller 2 for fitting the workpiece 200 into the through-holes 211 and 212 are now described with reference to FIGS. 19 to 23.

Figure 19:
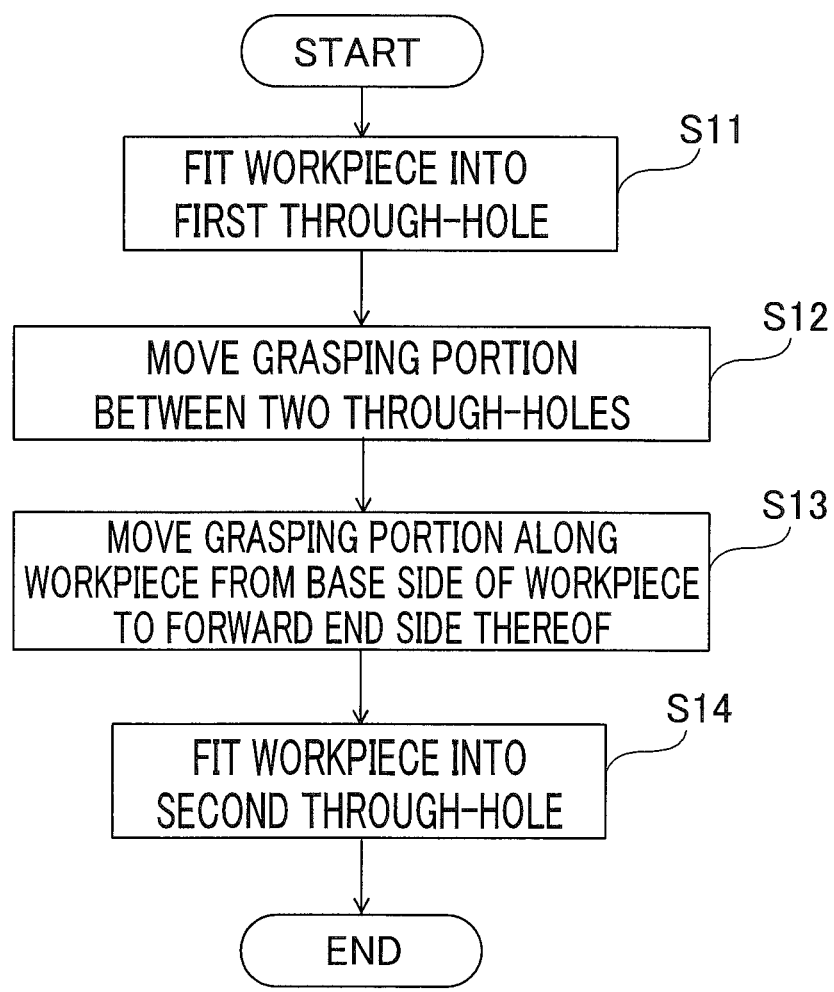
FIG. 19 is a flow diagram for illustrating operations of a control portion of the robot system according to the second embodiment.
Figure 20:
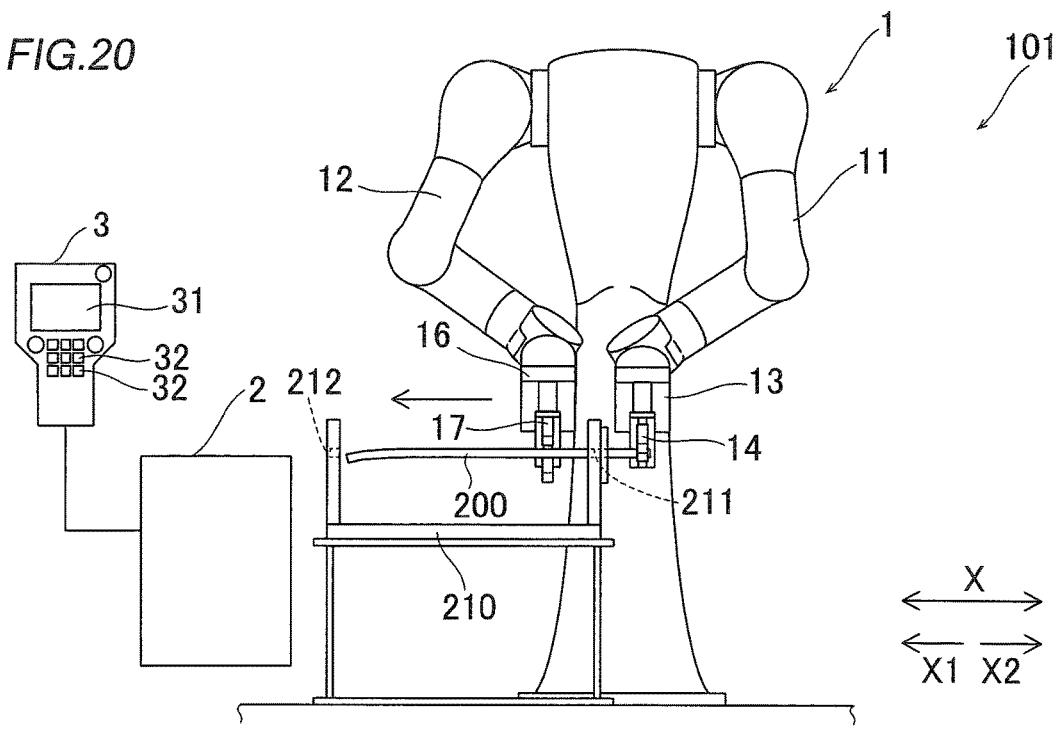
FIG. 20 is a diagram showing a state prior to guiding of a workpiece of the robot system according to the second embodiment.
Figure 21:
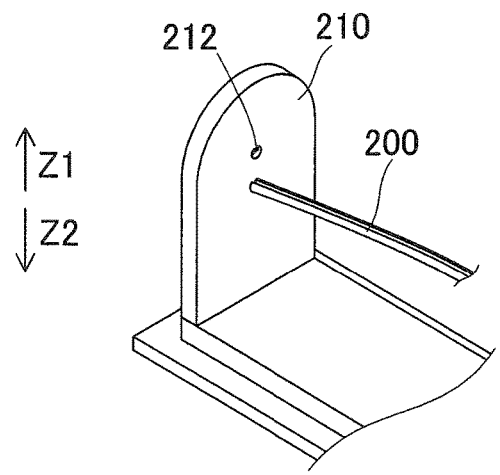
FIG. 21 is an enlarged view showing the state prior to guiding of the workpiece shown in FIG. 20.

First, the control portion 21 controls a grasping portion 13 of a robot arm 11 to grasp the base side of the workpiece 200 and fit the workpiece 200 into the first through-hole 211 while changing a control point P of the robot 1 in a direction opposite to the fitting direction when performing a follow operation at a step S11 shown in FIG. 19, similarly to the steps S1 to S5 according to the aforementioned first embodiment. As shown in FIG. 20, the workpiece 200 is moved along arrow X1 by the grasping portion 13 of the robot arm 11 and is moved to the vicinity of the through-hole 212. At this time, the base side of the workpiece 200 is fitted into the first through-hole 211, and hence the workpiece 200 is hardly bent laterally and upwardly. However, the forward end side of the workpiece 200 may be bent downwardly (along arrow Z2) by its own weight, as shown in FIG. 21.

Figure 22:
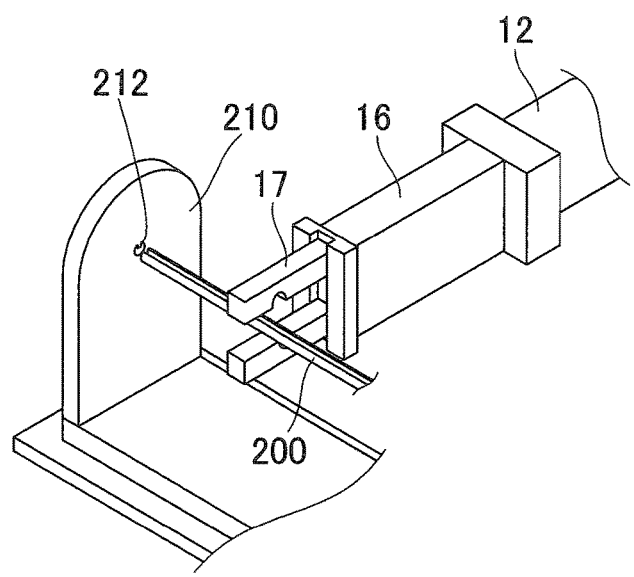
FIG. 22 is a diagram showing a state where a grasping portion of the robot system according to the second embodiment guides the workpieces.
Figure 23:
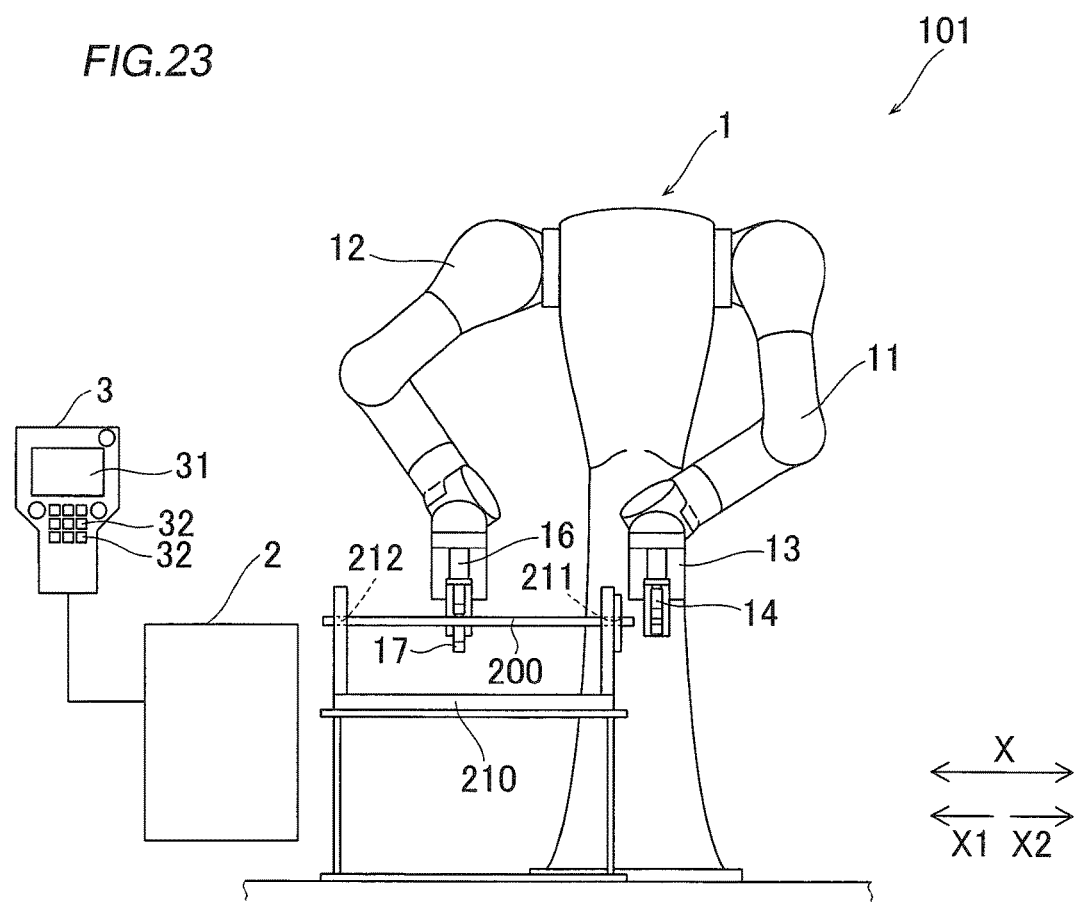
FIG. 23 is a diagram showing a state where the workpiece of the robot system according to the second embodiment is fitted into a workpiece fitted member.

Then, according to the second embodiment, the control portion 21 moves a guide grasping portion 16 of a robot arm 12 between the through-hole 211 and the through-hole 212 at a step S12. Then, the control portion 21 controls the guide grasping portion 16 of the robot arm 12 to guide the workpiece 200 while movably grasping the forward end side of the workpiece 200 passing through the through-hole 211 at a step S13. Specifically, the control portion 21 moves the guide grasping portion 16 of the robot arm 12 along the workpiece 200 from the base side (see FIG. 20) of the workpiece 200 to the forward end side (see FIG. 22) thereof, and thereafter controls the guide grasping portion 16 of the robot arm 12 to guide the workpiece 200 while movably grasping the forward end side of the workpiece 200. At this time, the guide grasping portion 16 of the robot arm 12 guides the workpiece 200 while supporting the lower side (lower surface) of the workpiece 200. Consequently, the forward end side of the workpiece 200 which is bent downwardly (along arrow Z2) extends substantially linearly, as shown in FIG. 22. Then, the control portion 21 controls the grasping portion 13 of the robot arm 11 to move the workpiece 200 along arrow X1 and fit the workpiece 200 into the second through-hole 212, as shown in FIG. 23 at a step S14, and the operations for fitting the workpiece 200 into the through-holes 211 and 212 are terminated.

According to the second embodiment, as hereinabove described, the grasping portion 13 of the robot arm 11 grasps the base side of the workpiece 200 and fits the workpiece 200 into the through-hole 211 while the control point P of the robot 1 is changed in the direction opposite to the fitting direction when the follow operation is performed, and thereafter the guide grasping portion 16 of the robot arm 12 is moved between the through-hole 211 and the through-hole 212 and guides the workpiece 200 while movably grasping the forward end side of the workpiece passing through the through-hole 211. Thus, the follow operation is performed and the control point P is changed when the workpiece 200 is fitted into the through-hole 211, and the forward end side of the workpiece 200 is guided when the workpiece 200 is fitted into the through-hole 212. Therefore, the workpiece 200 can be smoothly fitted into the through-hole 211 and the through-hole 212.

It should be understood by those skilled in the art that various modifications, combinations, sub-combinations, and alterations may occur depending on design requirements and other factors insofar as they are within the scope of the appended claims or the equivalents thereof.

For example, while the example of continuously changing the control point P of the robot according to the amount of movement of the workpiece in the fitting direction has been shown in each of the aforementioned first and second embodiments, the control point P of the robot may be changed in a phased manner (discontinuously) according to the amount of movement of the workpiece in the fitting direction, for example.

Figure 24:
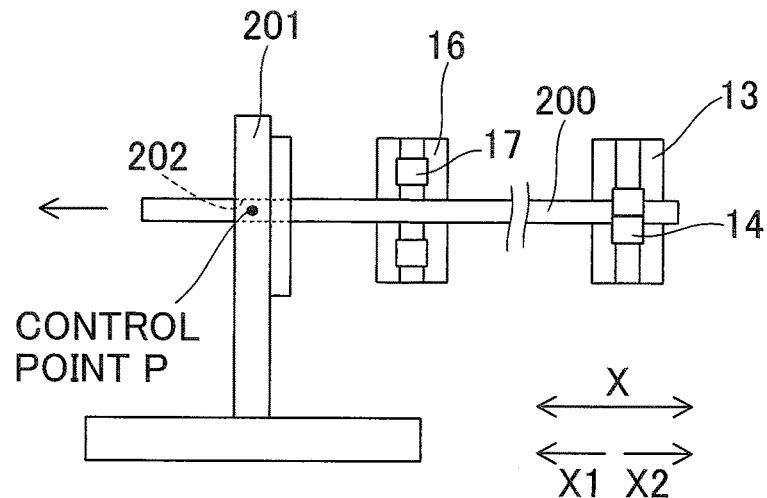
FIG. 24 is a diagram showing a control point of a robot system according to a first modification.

While the example of sequentially changing the control point P of the robot such that the control point P of the robot is located at the position of the workpiece corresponding to the vicinity of the end of the workpiece fitted portion (through-hole) including the hole, on the side from which the workpiece is inserted has been shown in each of the aforementioned first and second embodiments, the robot system may be configured as in a first modification shown in FIG. 24, for example. In other words, the control point P of the robot 1 may be sequentially changed such that the control point P of the robot 1 is located at the position of the workpiece 200 corresponding to a substantially central portion in the thickness direction of the through-hole 202 including the hole provided in the thin plate-like workpiece fitted member 201. Alternatively, the control point P of the robot 1 may be sequentially changed such that the control point P of the robot 1 is located at the position of the workpiece 200 corresponding to the vicinity of an end of the through-hole 202 on a side (along arrow X1) opposite to the side from which the workpiece 200 is inserted.

Figure 25:
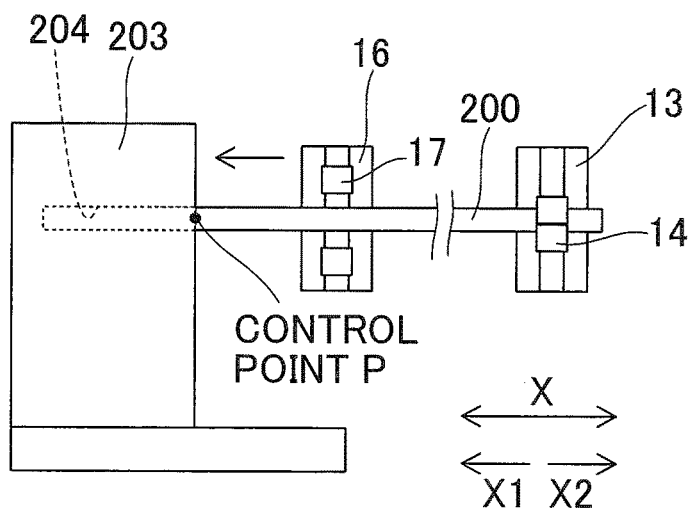
FIG. 25 is a diagram showing a workpiece fitted member of a robot system according to a second modification.

While the example of providing the workpiece fitted portion (through-hole) including the hole in the thin plate-like workpiece fitted member has been shown in each of the aforementioned first and second embodiments, the robot system may be configured as in a second modification shown in FIG. 25, for example. In other words, a workpiece fitted portion 204 including a hole not a through-hole may be provided in a workpiece fitted member 203 having a relatively large thickness. In this case, the control point P of the robot 1 may be sequentially changed such that the control point P of the robot 1 is located at the position of the workpiece 200 corresponding to the vicinity of an end of the workpiece fitted portion 204 on a side from which the workpiece 200 is inserted.

While the example of performing the follow operation by performing both an operation of translating the workpiece and an operation of rotating the workpiece about the control point P has been shown in each of the aforementioned first and second embodiments, the follow operation may be performed by performing one of the operation of translating the workpiece and the operation of rotating the workpiece about the control point P, for example.

While the example of fitting the long bar-shaped (substantially linear) workpiece into the workpiece fitted portion (through-hole) has been shown in each of the aforementioned first and second embodiments, a curved workpiece may be fitted into the workpiece fitted portion (through-hole), for example. It is difficult to insert the curved workpiece into the workpiece fitted portion (through-hole), and hence in this case, the curved workpiece can be easily fitted into the workpiece fitted portion (through-hole) by changing the control point P of the robot in the direction opposite to the fitting direction according to the amount of movement of the workpiece in the fitting direction when the follow operation is performed.

While the example of providing the control point change button configured to accept the input of the command for operating the robot in the operation mode in which the control point P of the robot is changed in the display portion of the teaching apparatus has been shown in each of the aforementioned first and second embodiments, the input of the command for operating the robot in the operation mode in which the control point P of the robot is changed may be accepted through one of the plurality of keys (see FIG. 1) of the teaching apparatus, for example.

While the example in which the guide grasping portion of the robot arm guides the workpiece while movably grasping the forward end side of the workpiece has been shown in each of the aforementioned first and second embodiments, the guide grasping portion of the robot arm may align the workpiece with the workpiece fitted portion (through-hole) while grasping the forward end side of the workpiece, for example.

What is claimed is:

1. A robot system comprising:
   a robot having a robot arm mounted with a grasping portion configured to grasp a workpiece; and
   a control portion transmitting an operation command to the robot,
   the control portion having:
   a fitting operation control portion configured to control the grasping portion of the robot arm to grasp the workpiece and perform a fitting operation while changing a control point set for the robot arm such that the workpiece follows a shape of a workpiece fitted member into which the workpiece is fitted; and
   a control point setting portion configured to change the control point of the robot in a direction opposite to a fitting direction by an amount of movement of the workpiece in the fitting direction during the fitting operation.

2. The robot system according to claim 1, wherein
   the control point setting portion is configured to set the control point of the robot in a vicinity of a forward end of the workpiece closer to the workpiece fitted member before the fitting operation and change the control point of the robot from the vicinity of the forward end of the workpiece to a base side thereof by the amount of movement of the workpiece in the fitting direction during the fitting operation.

3. The robot system according to claim 1, wherein
   the control point setting portion is configured to perform control of sequentially changing the control point of the robot such that the control point of the robot is located at a position of the workpiece corresponding to a vicinity of a close point where the workpiece and the workpiece fitted member are close to each other during the fitting operation.

4. The robot system according to claim 3, wherein
   the workpiece fitted member has a hole, and
   the control point setting portion is configured to perform control of sequentially changing the control point of the robot such that the control point of the robot is located at the position of the workpiece corresponding to a vicinity of an end of the hole on a side from which the workpiece is inserted while moving the workpiece in the fitting direction.

5. The robot system according to claim 3, wherein
the workpiece fitted member has a hole provided in a plate-like portion, and
the control point setting portion is configured to perform control of sequentially changing the control point of the robot such that the control point of the robot is located at the position of the workpiece corresponding to a substantially central portion of the workpiece fitted member in a thickness direction while moving the workpiece in the fitting direction.

6. The robot system according to claim 1, wherein
the control point setting portion is configured to fit the workpiece into the workpiece fitted member while changing the control point of the robot in the direction opposite to the fitting direction by the amount of movement of the workpiece in the fitting direction after inserting a forward end of the workpiece into the workpiece fitted member.

7. The robot system according to claim 1, wherein
the control point setting portion is configured to perform control of continuously changing the control point of the robot by the amount of movement of the workpiece in the fitting direction.

8. The robot system according to claim 1, wherein
the fitting operation control portion operates the robot to move the workpiece so as to follow the shape of the workpiece fitted member such that force and moment applied to the control point are reduced to substantially zero.

9. The robot system according to claim 1, further comprising a force sensor provided in the robot arm, wherein
the fitting operation control portion moves the workpiece to follow the shape of the workpiece fitted member on the basis of force information obtained from the force sensor.

10. The robot system according to claim 9, wherein
the fitting operation control portion moves the workpiece to follow the shape of the workpiece fitted member by performing at least one of an operation of translating the workpiece and an operation of rotating the workpiece about the control point on the basis of the force information obtained from the force sensor.

11. The robot system according to claim 1, further comprising a teaching apparatus configured to teach an operation of the robot, wherein
the teaching apparatus includes an input portion configured to accept an input of a command for operating the robot in an operation mode in which the control point of the robot is changed by the amount of movement of the workpiece in the fitting direction when teaching the operation of the robot.

12. The robot system according to claim 1, wherein
the robot includes at least two robot arms of a first robot arm and a second robot arm, and
the fitting operation control portion guides a forward end side of the workpiece by a grasping portion of the second robot arm, and pushes the workpiece toward the workpiece fitted member and inserts a forward end of the workpiece into the workpiece fitted member by the first robot arm.

13. The robot system according to claim 1, wherein
the robot includes at least two robot arms of a first robot arm and a second robot arm,
the workpiece fitted member includes a first through-hole and a second through-hole arranged adjacent to each other in the fitting direction of the workpiece, and
the fitting operation control portion is configured to perform control of fitting the workpiece into the second through-hole by moving a grasping portion of the second robot arm between the first through-hole and the second through-hole and guiding the workpiece while movably grasping a forward end side of the workpiece passing through the first through-hole by the grasping portion of the second robot arm after grasping a base side of the workpiece and fitting the workpiece into the first through-hole by a grasping portion of the first robot arm.

14. The robot system according to claim 1, wherein
the control point setting portion is configured to change the control point of the robot in the direction opposite to the fitting direction repeatedly when interference is avoided.

15. A method for manufacturing a component employing a workpiece, comprising:
grasping the workpiece by a grasping portion of a robot arm;
moving a control point set for the robot arm such that the workpiece follows a shape of a workpiece fitted member into which the workpiece is fitted and performing a fitting operation; and
changing the control point of the robot in a direction opposite to a fitting direction by an amount of movement of the workpiece in the fitting direction during the fitting operation.

16. The method for manufacturing a component according to claim 15, wherein
changing the control point of the robot in the direction opposite to the fitting direction by the amount of movement of the workpiece in the fitting direction during the fitting operation includes setting the control point of the robot in a vicinity of a forward end of the workpiece closer to the workpiece fitted member before the fitting operation and changing the control point of the robot from the vicinity of the forward end of the workpiece to a base side thereof by the amount of movement of the workpiece in the fitting direction during the fitting operation.

17. The method for manufacturing a component according to claim 15, wherein
changing the control point of the robot in the direction opposite to the fitting direction by the amount of movement of the workpiece in the fitting direction during the fitting operation includes sequentially changing the control point of the robot such that the control point of the robot is located at a position of the workpiece corresponding to a vicinity of a close point where the workpiece and the workpiece fitted member are close to each other during the fitting operation.

18. The method for manufacturing a component according to claim 17, wherein
sequentially changing the control point of the robot such that the control point of the robot is located at the position of the workpiece corresponding to the vicinity of the close point where the workpiece and the workpiece fitted member are close to each other during the fitting operation includes sequentially changing the control point of the robot such that the control point of the robot is located at the position of the workpiece corresponding to a vicinity of an end of the workpiece fitted member including a hole, on a side from which the workpiece is inserted while the workpiece is moved in the fitting direction.

19. The method for manufacturing a component according to claim 17, wherein
sequentially changing the control point of the robot such that the control point of the robot is located at the position of the workpiece corresponding to the vicinity of the close point where the workpiece and the workpiece fitted member are close to each other during the fitting operation includes sequentially changing the control point of the robot such that the control point of the robot is located at the position of the workpiece corresponding to a substantially central portion of the workpiece fitted member in a thickness direction.

20. The method for manufacturing a component according to claim 15, wherein
changing the control point of the robot in the direction opposite to the fitting direction by the amount of movement of the workpiece in the fitting direction during the fitting operation includes fitting the workpiece into the workpiece fitted member while the control point of the robot is changed in the direction opposite to the fitting direction by the amount of movement of the workpiece in the fitting direction after a forward end of the workpiece is inserted into the workpiece fitted member.

21. The method for manufacturing a component according to claim 15, wherein
changing the control point of the robot in the direction opposite to the fitting direction by the amount of movement of the workpiece in the fitting direction during the fitting operation includes continuously changing the control point of the robot by the amount of movement of the workpiece in the fitting direction.

22. The method for manufacturing a component according to claim 15, wherein
changing the control point of the robot in the direction opposite to the fitting direction by the amount of movement of the workpiece in the fitting direction by the amount of movement of the workpiece in the fitting direction during the fitting operation includes changing the control point of the robot in the direction opposite to the fitting direction repeatedly when interference is avoided.

* * * * *